(12) United States Patent
Cowley et al.

(10) Patent No.: US 8,306,753 B2
(45) Date of Patent: Nov. 6, 2012

(54) SKIN MODELING METHODS AND SYSTEMS

(75) Inventors: Kevin David Cowley, Reading (GB); David John O'Callaghan, Reading (GB)

(73) Assignee: The Gillette Company, Boston, MA (US)

( * ) Notice: Subject to any disclaimer, the term of this patent is extended or adjusted under 35 U.S.C. 154(b) by 386 days.

(21) Appl. No.: 12/749,849

(22) Filed: Mar. 30, 2010

(65) Prior Publication Data

US 2010/0256966 A1 Oct. 7, 2010

Related U.S. Application Data

(60) Provisional application No. 61/165,922, filed on Apr. 2, 2009.

(51) Int. Cl.
*G01N 33/50* (2006.01)
(52) U.S. Cl. .......................................................... 702/19
(58) Field of Classification Search .................. None
See application file for complete search history.

(56) References Cited

U.S. PATENT DOCUMENTS

| | | |
|---|---|---|
| 4,655,227 A | 4/1987 | Gracovetsky |
| 5,205,293 A | 4/1993 | Ito et al. |
| 5,628,230 A | 5/1997 | Flam |
| 5,821,415 A | 10/1998 | Faust et al. |
| 5,916,179 A | 6/1999 | Sharrock |
| 6,810,130 B1 | 10/2004 | Aubert et al. |
| 7,206,623 B2 | 4/2007 | Blank et al. |
| 7,718,105 B2 | 5/2010 | Tye et al. |
| 7,731,500 B2 | 6/2010 | Feygin et al. |

FOREIGN PATENT DOCUMENTS

WO WO 2007/074728 A1 7/2007

OTHER PUBLICATIONS

Holzapfel, G.A. "Similarities between soft biological tissues and rubberlike materials." *Constitutive Models for Rubber IV* A.A. Balkema Publishers: Leiden (2005) 607-617.
Giavazzi, Ganatea, Trkov, Sustaric, Rodic: "Inverse determination of viscoelastic properties of human fingertip skin." Homepage of *Journal RMZ—Materials and Geoenvironment*, vol. 57, No. 1, Mar. 29, 2010, 1-16.
PCT International Search Report with Written Opinion in corresponding Int'l appln. PCT/US2010/029537 dated Sep. 6, 2010.

*Primary Examiner* — Jason Sims
(74) *Attorney, Agent, or Firm* — Kevin C. Johnson; Steven W. Miller

(57) ABSTRACT

A system and method for generating a numerical skin model. The skin model may be used to predict the interaction of the skin to various devices, such as shaving devices and absorbent articles, for example. The computer-based numerical skin material model of the simulated skin may comprise a mechanical behavior model of a surface epidermis, a mechanical behavior model of a dermis, a mechanical behavior model of a hypodermis, and a van der Waals hyperelastic formulation to represent the behavior of the simulated skin. A strain stiffening viscoelasticty of the simulated human skin may be determined by a Prony time series expansion.

34 Claims, 15 Drawing Sheets

SKIN MODELING METHODS AND SYSTEMS

CROSS REFERENCE TO RELATED APPLICATIONS

This application claims the benefit of U.S. provisional application No. 61/165,922, filed Apr. 2, 2009.

FIELD OF THE INVENTION

The present disclosure is directed to an improved method of producing a device, such as a shaving device or an absorbent article, in accordance with a skin model for predicting the response of skin to the device.

BACKGROUND OF THE INVENTION

At the outset, it should be noted that a person's skin and hair, among other biological materials, respond non-linearly under load of a device, such as a razor of a shaving device or absorbent articles, for example. These materials also are sensitive to hydration state, the age of the person, the site of the skin, and numerous other factors. When developing a device for delivering a load to skin, multiple factors should be considered. For a shaving device, factors such as the contact between the blades, skin surface, and the hair, for example, should be considered. Friction values, and other performance characteristics, may be dependent upon the shave preparation method, the skin, and other attributes. During shaving, both hair and the skin experience gross deformation under load, and, therefore, the speed of their response should be considered during the development of the shaving apparatus. Due to the mechanical complexity of the skin in response to a load, there is a need for a robust model that can predict the mechanical behavior of skin during various dynamic loading regimes, such as those found during a shaving stroke.

SUMMARY OF THE INVENTION

In one general aspect, the present disclosure is directed to a method for modeling the response of skin to a device design. The method may comprise determining a computer-based design of a device, such as a shaving device or an absorbent article, and determining with a computer system a predicted skin interaction with a load delivered by the device using a computer generated numerical skin material model. In various embodiments, the numerical skin material model may comprise a simulated skin, a mechanical behavior model of a surface epidermis, a mechanical behavior model of a dermis, a mechanical behavior model of a hypodermis, and a van der Waals hyperelastic formulation to represent the behavior of the simulated skin, such as non-linear behavior, for example. The numerical skin material model may further comprise a Prony time series expansion to represent non-linear viscoelastic strain stiffening.

BRIEF DESCRIPTION OF THE DRAWINGS

Various embodiments are described herein by way of example in conjunction with the following figures, wherein.

DETAILED DESCRIPTION OF THE INVENTION

In one general aspect, the present disclosure is directed to a computer-implemented skin model for predicting the response of skin to a simulated shaving stroke of a shaving apparatus in order to provide performance feedback for the interacting shaving apparatus. In various embodiments, the computer-implemented skin model may predict the response of skin to a simulated load to other devices, such as absorbent articles, for example. In various embodiments, in order to develop the model, the skin layer thicknesses and mechanical response to loading are characterized based on in vivo experimental tests. In one embodiment, the skin model may consist of three layers representing the epidermis, the dermis, and the hypodermis (or "subcutaneous tissue"), for example. In various embodiments, measurements, such as ultrasonic measurements, are used to determine the total depth of the skin at various locations, such as facial regions, neck regions, legs regions, groin regions, axilla regions, hips, buttocks, female shaving regions, or other sites for body groomers and/or absorbent articles.

Figure 1A:
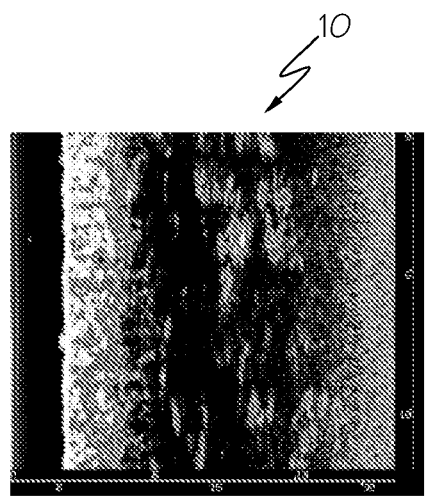
FIGS. 1A-1B show an ultrasonic image of tissue.
Figure 1B:
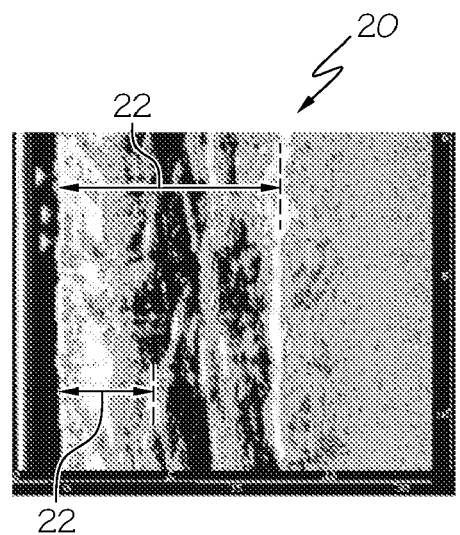

FIGS. 1A-1B show an ultrasonic image of tissue. In one embodiment, a 20 MHz Cortex ultrasound with a 60 μm depth resolution providing maximum depth of 15 mm is used for obtaining the measurements of the tissue. As may be appreciated, the skin depths for a plurality of participants may be obtained and averaged, or otherwise compiled. In one embodiment, the skin depths for over 25 participants are obtained. With reference to FIG. 1A, an image 10 provides a sample ultrasonic image of the tissue of a participant's cheek. An image 20 in FIG. 1B provides a sample ultrasonic image of the tissue of a participant's cheekbone. Based on data collected from the ultrasonic images, measurements of the total skin depth from the participants may be determined by a computer system. In one embodiment, the average total skin tissue thickness 22 for a group of participants is 20 mm and the average total cheekbone skin tissue thickness 24 for a group of participants is 7.45 mm.

Figure 2A:
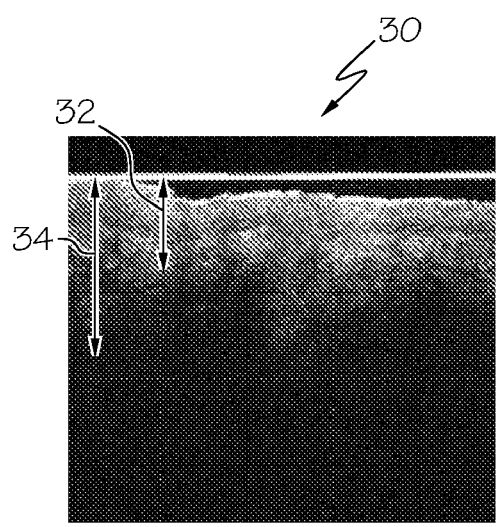
FIGS. 2A-2B show an optical coherence tomography image of tissue.
Figure 2B:
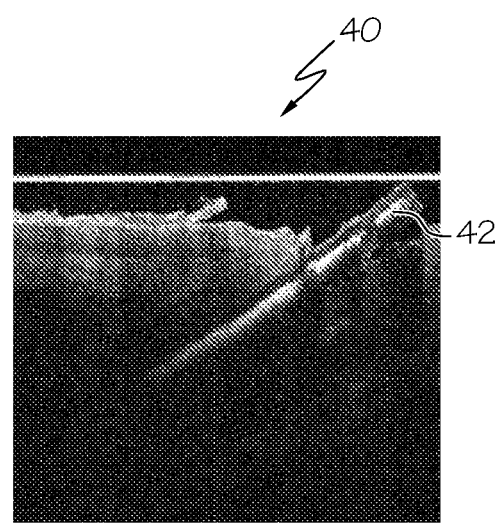

FIGS. 2A-2B show an optical coherence tomography image of tissue. In order to determine the depth of the epidermis and dermis layers, in one embodiment, optical coherence tomography ("OCT"), having an infrared light of 1300 nm wavelength, ~2 μm depth resolution, and a maximum depth of 500 μm, may be used. As illustrated in FIG. 2A, an image 30 from the OCT processed by a computing system may be used to determine the thicknesses of the epidermis and dermis. FIG. 2B illustrates an image 40 from the OCT showing a hair follicle 42. As may be appreciated, the depth of the epidermis and dermis layers of a plurality of participants may be measured. In one embodiment, the epidermis and dermis layers for over 17 participants are obtained using the OCT measurement techniques. In one embodiment, the average epidermis thickness 32 is 0.05 mm and the average dermis thickness 34 is 1.95 mm. Measurement models for other skin locations, such as chin models, may be created by adding or subtracting a thickness from the subcutaneous tissue layer of the cheekbone bone. In one embodiment, 1.1 mm is removed from the subcutaneous layer of the cheekbone model to form a chin model.

Figure 3A:
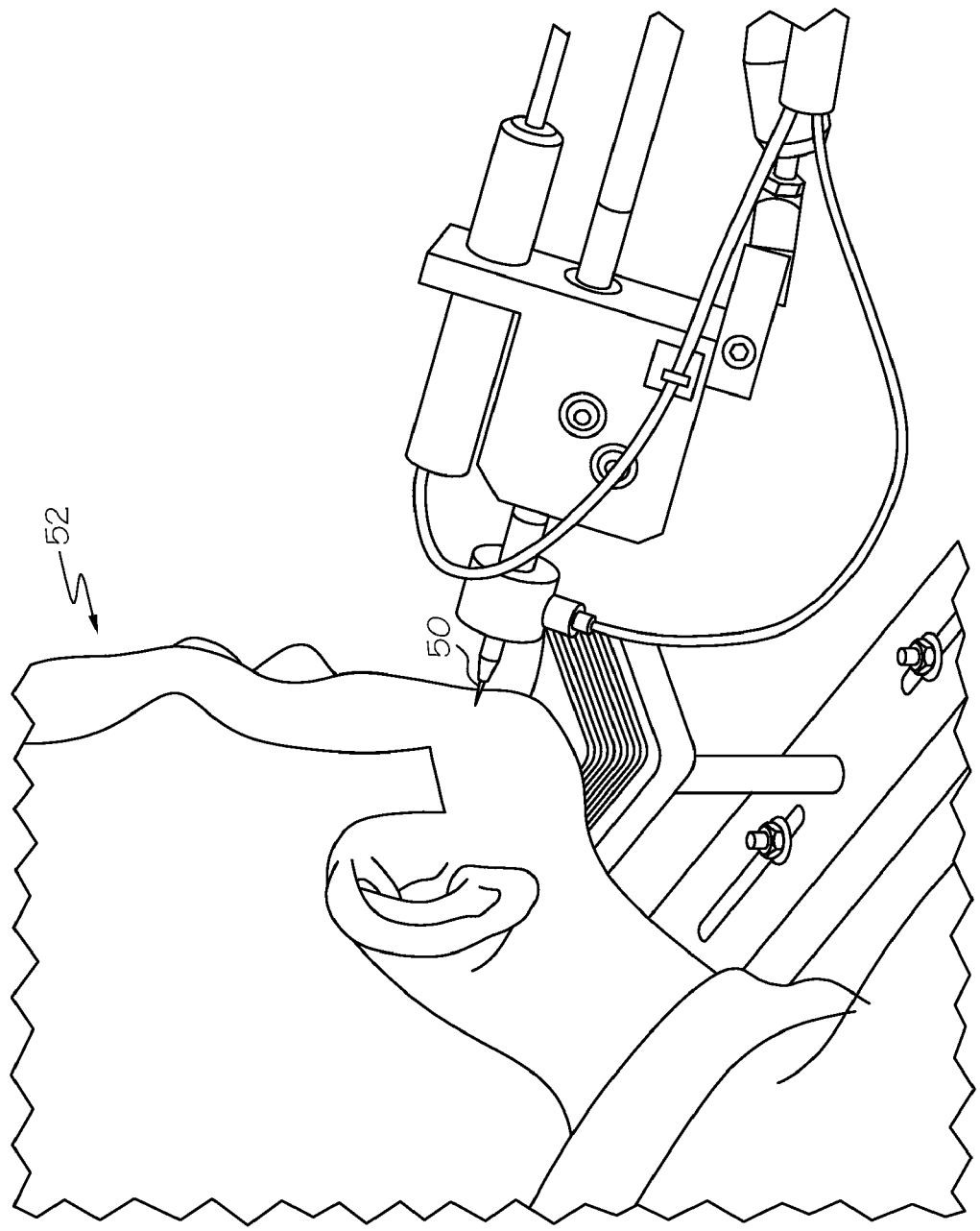
FIG. 3A shows a probe indent test apparatus in use to measure the normal force skin deflection of a skin tissue region.

FIG. 3A shows a probe indent test apparatus in use to measure the normal force skin deflection of a skin tissue region. In order to further develop the computerized skin model, a probe indent test may be used to measure the normal force deflection of a skin tissue region. Generally, the normal force deflection is predominately influenced by the subcutaneous layer. In one embodiment, a 1 mm diameter probe is used to measure the compression response of tissue, such as facial tissue. As illustrated FIG. 3A, a probe 50 is indented into the skin of a panelist 52 using an indent speed of ~3 mm/sec. It is appreciated that various indent speeds may be used. The probe 50 may be indented on both dry and hydrated skin, and may be indented at various surface locations.

Figure 3B:
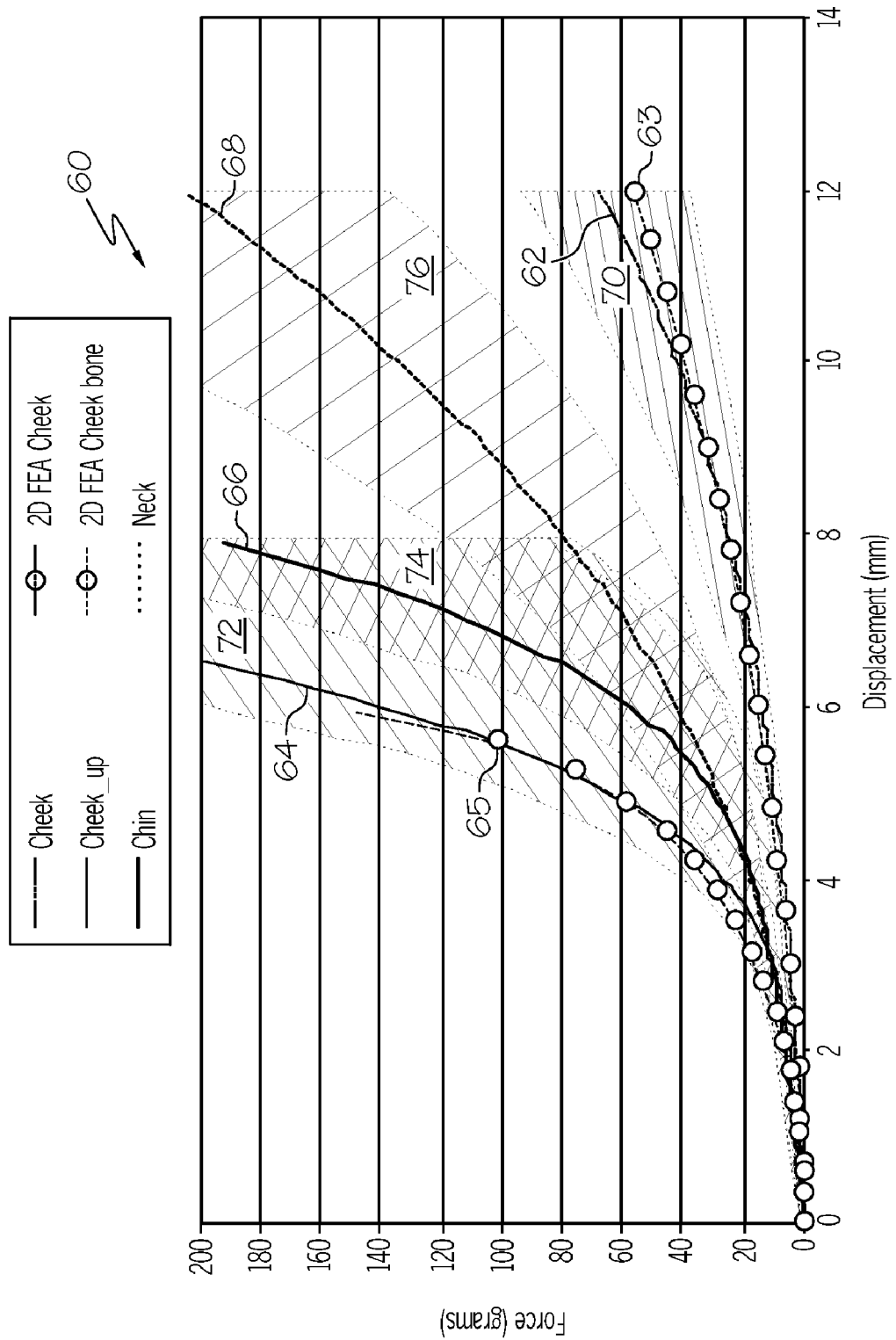
FIG. 3B shows a graph produced with data obtained from the probe indent test of FIG. 3A.

FIG. 3B shows a graph 60 produced with skin response data obtained from the probe indent test of FIG. 3A. The graph 60 illustrates a graphical comparison of the probe indent test measurements to skin indent predicted by a finite element analysis ("FEA") model. The graph 60 may be generated using a computer system from the various measurements that represent the skin displacement along the horizontal axis versus force for various skin sites along the vertical axis. For example, the skin sites may include the cheek, the upper cheek, the chin, and the neck. Accordingly, the graph 60 may include a cheek plot 62, an upper cheek plot 64, a chin plot 66, and a neck plot 68. Based on the averages from numerous participants, envelopes representing the variations in measurements among the various people may be included on the graph 60. For example, the graph 60 may include a cheek envelope 70, an upper cheek envelope 72, a chin envelope 74, and a neck envelope 76. The FEA predictive plot for the cheek is shown as FEA model prediction plot 63, and the FEA predictive plot for the cheekbone is shown as FEA model prediction plot 65.

Figure 4A:
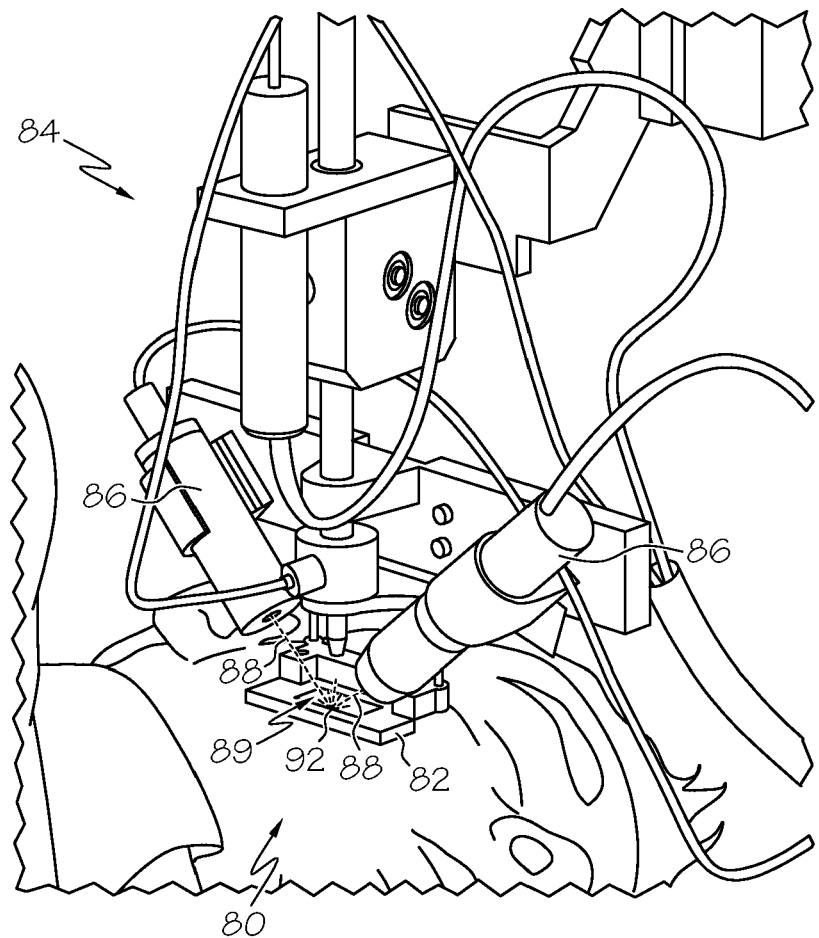
FIG. 4A shows a skin bulge test apparatus in use to measure the displacement of a skin tissue region in response to a force applied thereto.

In order to further develop the model, the results from a skin bulge test may be incorporated. FIG. 4A shows a skin bulge test apparatus in use to measure the displacement of a skin tissue region in response to a force applied thereto. The dermis layer is considered to predominantly affect the skin bulge height. In one embodiment, a skin bulge test using a slotted die indented onto the skin at ~3 mm/sec is used. The slot width in the die may be varied during the test. For example, tests may be performed with the slot width at 1 mm, 2 mm, and 4 mm and the skin bulge is measured for each width. As maybe appreciated, other slot widths may be used. As illustrated in FIG. 4A, the skin 80 of a participant may be subjected to a die 82 during the test. The die 82 may be attached to a test unit 84. The test unit 84 may be controlled by a computing system (not shown) and may comprise a measurement device, such as a laser 86. Laser beams 88 are directed to the slot and scattered light 89 is detected to measure the skin bulge, which is further illustrated in FIG. 4B. As illustrated, the test unit 86 may comprise a plurality of measurement devices.

Figure 4B:
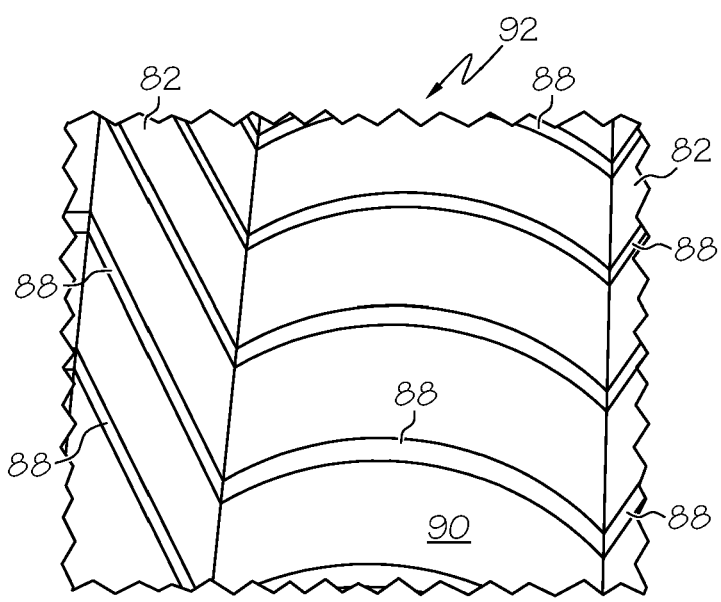
FIG. 4B shows a skin bulge in accordance with forces applied with the skin bulge test apparatus of FIG. 4A.
Figure 4C:
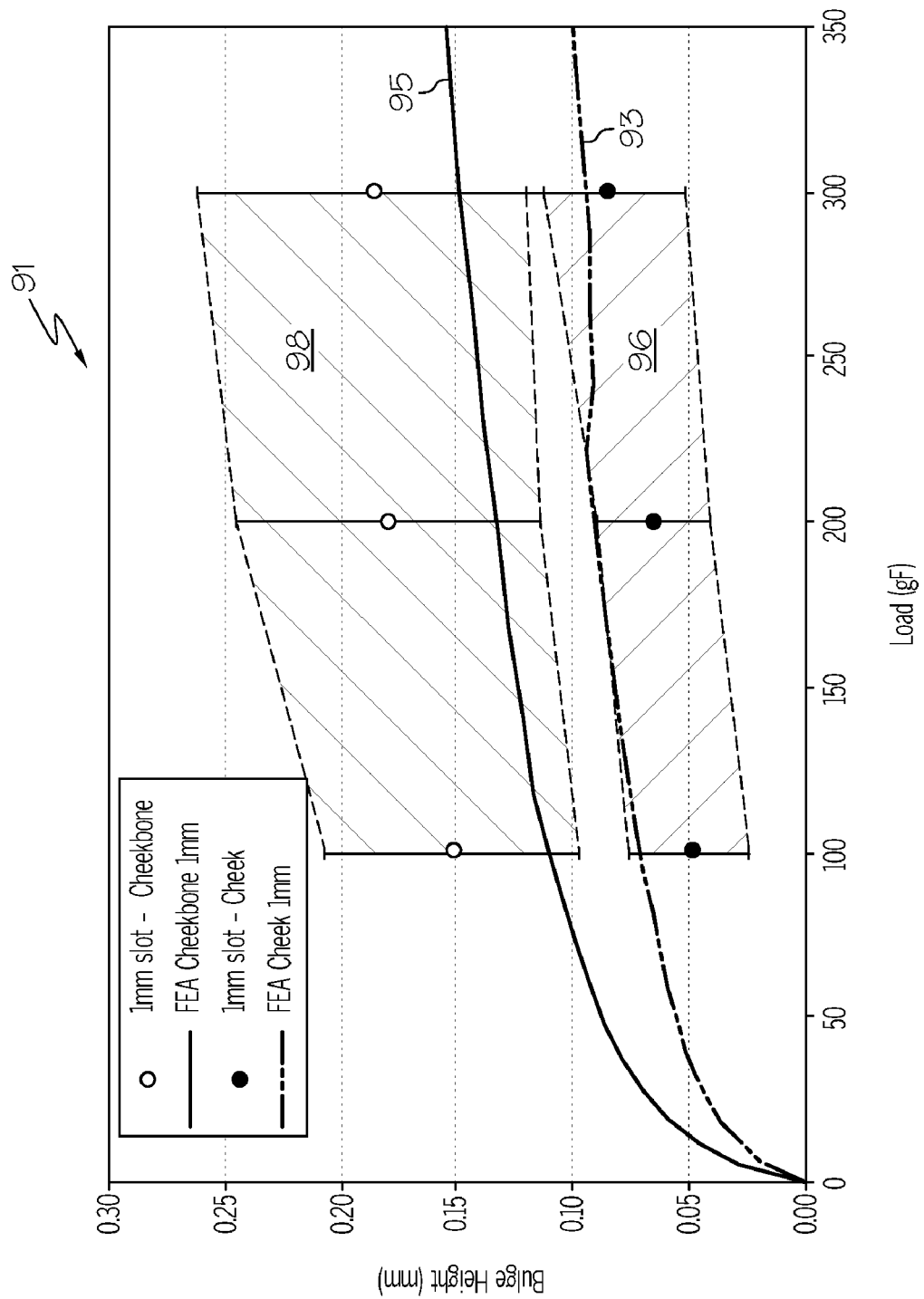
FIG. 4C shows a graph produced with data from the probe indent test of FIG. 4A.

FIG. 4B shows a skin bulge response in accordance with forces applied with the skin bulge test apparatus of FIG. 4A. FIG. 4B illustrates a skin bulge 90 caused by a slot 92 in the die 82. The laser 86 may project beams 88 across the skin bulge 90 to measure its displacement. During measurement, the displacement of the skin 80 and the force applied to the skin 80 may be displayed and/or recorded or stored in a computer-readable medium. The illustrated skin bulge 90 displacement is approximately 0.93 mm at an applied force of about 215.1 gF (gram-force). Based on the relationship of the skin bulge 90 displacement to force, a graph 91 may be created (FIG. 4C). The graph 91 illustrates a graphical comparison of skin bulge measurements to skin bulges predicted by FEA for the cheekbone and cheek. The graph 91 illustrates a load in "gF" along the longitudinal axis and a bulge height in "mm" along the vertical axis. The graph 91 may include FEA model predicted plots from various testing locations for a particular die slot 92 width, such as a FEA cheek plot 93 and a FEA cheekbone plot 95. Based on the averages from numerous participants, envelopes representing the variations in measurements among the various people may be included on the graph 91 and compared to the FEA model predicted plots 93, 95. For example, the graph 91 may include a cheek envelope 96 and a cheekbone envelope 98 based on skin bulge measurements though a 1 mm slot 92. The cheek envelope 96 is shown in comparison to the model predicted FEA cheek plot 93. Similarly, the cheekbone envelope 98 is shown in comparison to the model predicted FEA cheekbone plot 95.

Figure 5B:
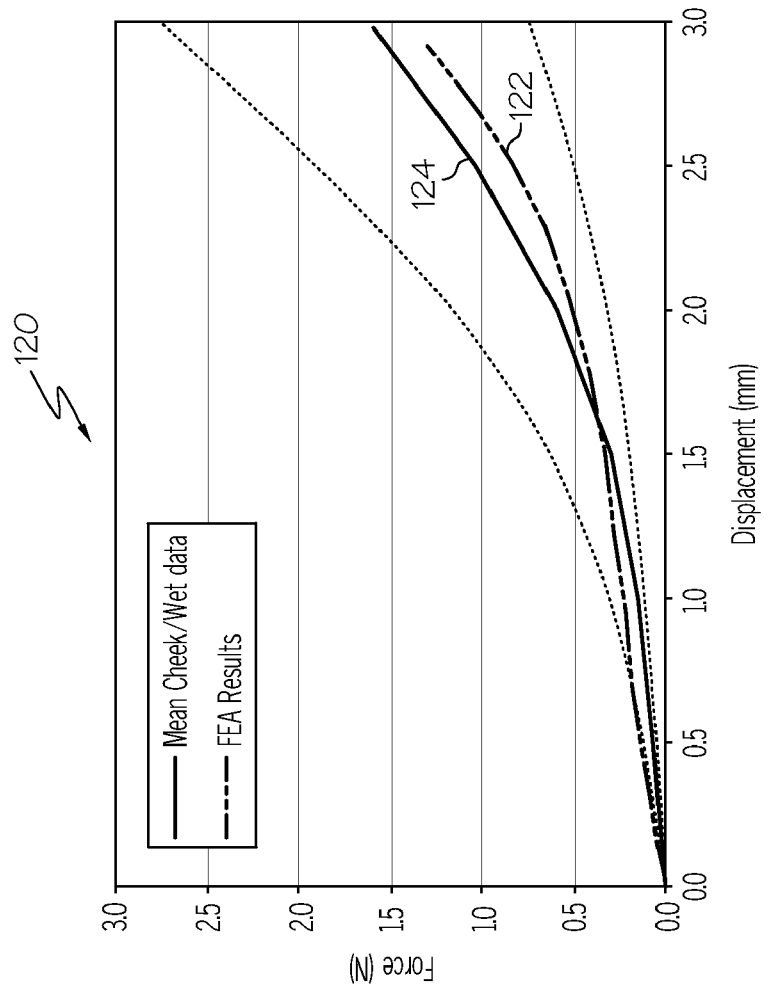
FIG. 5B shows a graph produced with data obtained from the extensometry test of FIG. 5A.
Figure 5A:
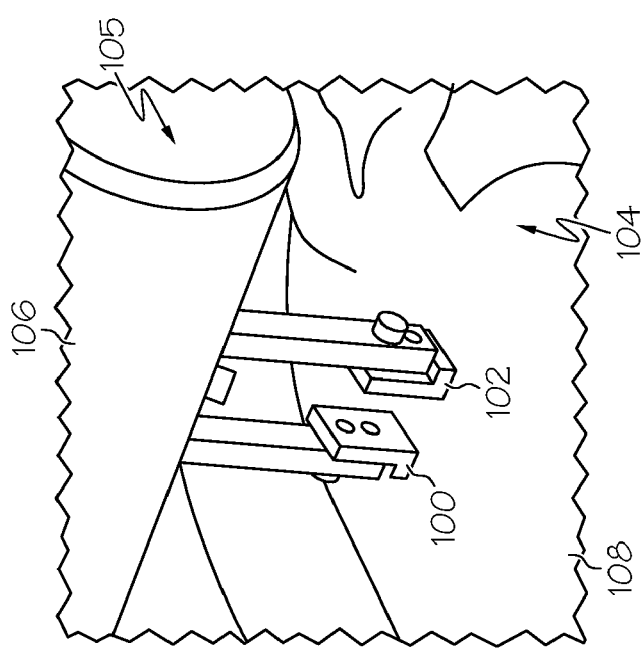
FIG. 5A shows an extensometry test apparatus in use to measure the tensile response of the surface tissue.

In order to further develop the model, as illustrated in FIG. 5A, an extensometry test may be used to determine the tensile response of surface tissue in various locations on the participants. In one embodiment, as illustrated in FIG. 5A, an example test fixture 105 is shown. The test fixture 105 may comprise a first foot 100 and a second foot 102 that are attached to a separator 106. The separator 106 may apply force to separate the feet at a specified speed and/or distance. Then a first foot 100 and a second foot 102 are glued, or otherwise attached, to the skin 108 of a panelist 104. The first foot 100 and the second foot 102 may be separated using the separator 106. The separation may occur at any suitable speed and distance, such as ~5 mm/sec for 3 mm. The separator 106 may be controlled by a computing system. The testing may be done for any desired tissue surface, such as the neck and cheek. The feet 100, 102 may be held apart and the relaxation rate of the skin 108 measured to allow for the capture of the viscoelastic strain stiffening effect.

FIG. 5B shows a graph produced with data obtained from the extensometry test of FIG. 5A. The data may be compiled by a computer and a graph 120 may be constructed based on measurements obtained during the extensometry test and compared to a FEA model. As may be appreciated, the force displacement relationship illustrated in the graph 120 may be mostly dominated by the epidermis layer. The graph 120 may include various plots, such as the FEA model prediction plot 122 and mean cheek/wet data plot 124.

Figure 6B:
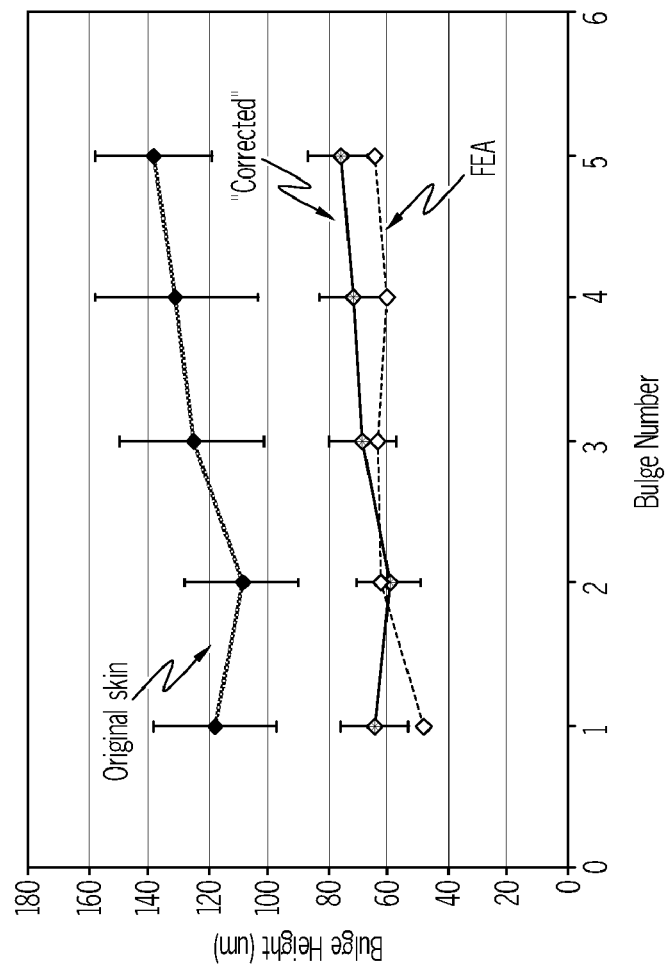
FIGS. 6B-6D show graphs produced with data obtained from the maneuverability test of FIG. 6A.
Figure 6A:
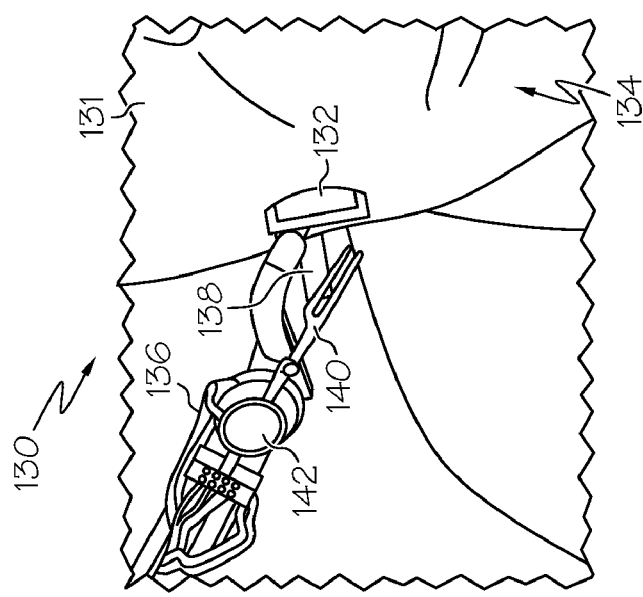
FIG. 6A shows a maneuverability test apparatus in use to validate one embodiment of a skin model.

FIG. 6A shows a maneuverability test apparatus in use to validate one embodiment of a skin model. In various embodiments, in order to validate the skin model, a cartridge maneuverability test may be carried out. In one embodiment, the cartridge maneuverability test comprises indenting a razor cartridge onto the skin and measuring the cartridge attitude load and skin bulge resulting therefrom. The actual measurements may be compared to the predictions of the FEA model in order to finally validate the skin model. A sample cartridge maneuverability test 130 is illustrated in FIG. 6A. As shown, a cartridge 132 is indented against the skin 131 of a participant 134. During the test, the cartridge 132 may be supported by an arm 136. The attitude of the cartridge 132 may be measured using any suitable technique. In one example, the cartridge 132 comprises a stem 138 that engages a fork 140. As the cartridge 132 articulates, the movement is translated to the fork 140 via the stem 138. The angular movement of the fork 140 may be measured by a rotary encoder 142 to determine the cartridge-to-skin angle versus the stem 138 attitude. Other measurements, such as load, drag, and swivel, may be taken during the test as well.

Figure 6D:
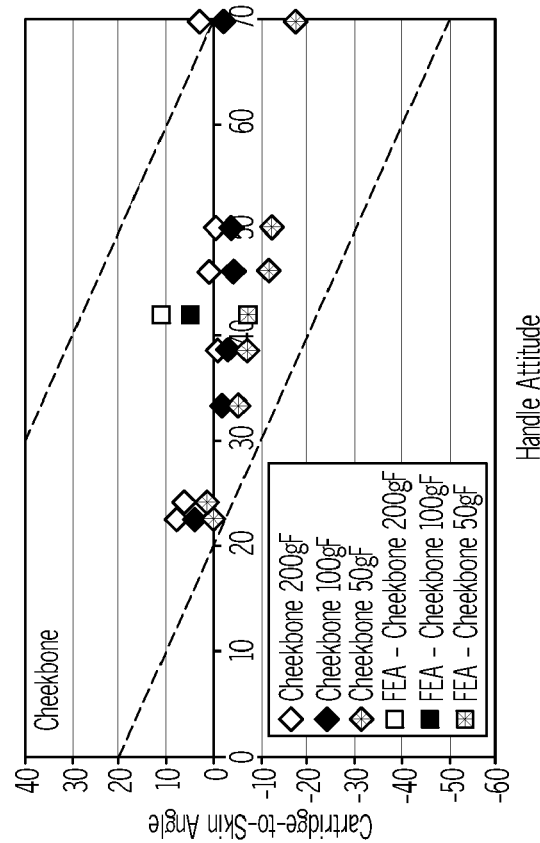
Figure 6C:
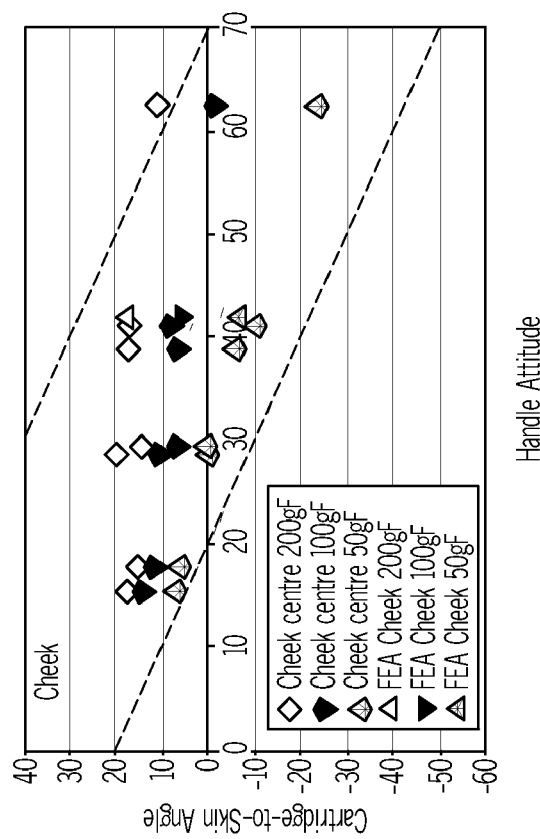

FIGS. 6B-6D show graphs produced with data obtained from the maneuverability test of FIG. 6A. FIG. 6B shows a comparison of both the maneuverability test results and the FEA results of inter-blade skin bulge. In one embodiment, the original skin curve is obtained using a dental replica material molded between blades of the cartridge maneuverability test illustrated in FIG. 6A to capture the inter-blade skin bulge. As may be appreciated, other techniques may be used to capture the inter-blade skin bulge during the maneuverability test. In the illustrated embodiment, a correction was applied to the original skin curve to subtract the viscoelastic relaxation of the skin during the time-elapsed replica acquisition. The corrected curve is the anticipated instant skin bulge after indenting the cartridge in the maneuverability test of FIG. 6A.

FIGS. 6C-6D compare results of the cartridge-to-skin angle of various indent loads on the cheek and cheekbone, respectively, from the cartridge maneuverability test illustrated in FIG. 6A. As illustrated, cartridge indent loads of 50 gF, 100 gF and 200 gF are reasonably correlated at handle attitudes of 22 degrees and 44 degrees inclined to the skin.

Once the various skin tests have been performed, a skin model may be numerically characterized on various sites using a FEA approach. In one embodiment, a cheek site and a cheekbone site are characterized. A van der Waals formulation may be used for each skin layer to develop a computer-based hyperelastic constitutive material model. In one embodiment, the van der Waals formulation in terms of its strain energy potential may be expressed as formula (1):

$$U = \mu\left\{-(\lambda_m^2 - 3)[\ln(1-\eta) + \eta] - \frac{2}{3}\alpha\left(\frac{\tilde{I}-3}{2}\right)^{\frac{3}{2}}\right\} + \frac{1}{D}\left(\frac{J_{el}^2-1}{2} - \ln J_{el}\right) \quad (1)$$

where:
  $\mu$ is the shear modulus;
  $\lambda_m$ is the locking stretch;
  $\alpha$ is the global interaction parameter;
  D is the compressibility;
  $\beta$ is a linear mixture parameter, (0.0<$\beta$<1.0);
  $J_{e1}$ is the elastic volume strain;
  $\tilde{I}$ is a strain invariant;

$$\eta = \sqrt{\frac{\tilde{I}-3}{\lambda_m^2-3}};$$

Strain invariant $\tilde{I}$ may be expressed as formula (2):

$$\tilde{I} = (1-\beta)\tilde{I}_1 + \beta\tilde{I}_2 \quad (2)$$

wherein
  $\beta$ is a linear mixture parameter, (0.0<$\beta$<1.0);

$$\tilde{I}_1 = \overline{\lambda_1}^2 + \overline{\lambda_2}^2 + \overline{\lambda_3}^2$$

$$\tilde{I}_2 = \overline{\lambda_1}^{(-2)} + \overline{\lambda_2}^{(-2)} + \overline{\lambda_3}^{(-2)}$$

The three lambda vectors ($\overline{\lambda_1}$, $\overline{\lambda_2}$, $\overline{\lambda_3}$) refer to the three spatial direction of stretch, such as in the "x", "y", and "z" directions of a Cartesian coordinate system.

In various embodiments, strain stiffening viscoelastic effects of the skin are represented by the following Prony time series expansion (3):

$$\mu^R(t) = \mu^0\left(1 - \sum_{k=1}^{N} \bar{g}_k^P(1-e^{-t/\tau_k})\right) \quad (3)$$

where:
  $\mu^R(t)$ is the relaxation coefficient at time (t);
  $\mu^0$ is the initial value of the Prony time series expansion at the beginning of the relaxation time;
  $\bar{g}_i^P$ is the moduli ratio of the shear modulus; and
  $\tau_i$ is the relaxation time for the first term in the Prony time series expansion.

The dimensions obtained from the OCT and ultrasound, as well as the results obtained from the probe indent, skin bulge, and extensometry tests previously described, may be used primarily to characterize the non-linear elasticity of each layer of skin. The extensometry relaxation measurements may be used to characterize the strain stiffening viscoelastic skin behavior. In one embodiment, the FEA characterization may be carried out using the "ABAQUS" commercial FEA code which contains the hyperelastic and viscoelastic constitutive material formulations. The FEA model validation may be carried out by iterating the values of each layer of skin according to the experimental test being benchmarked. The material parameters in the van der Waals formulation, such as shear modulus, locking stretch and global interaction parameter, may be modified to give an acceptable agreement with curves generated from measurements.

Figure 7:
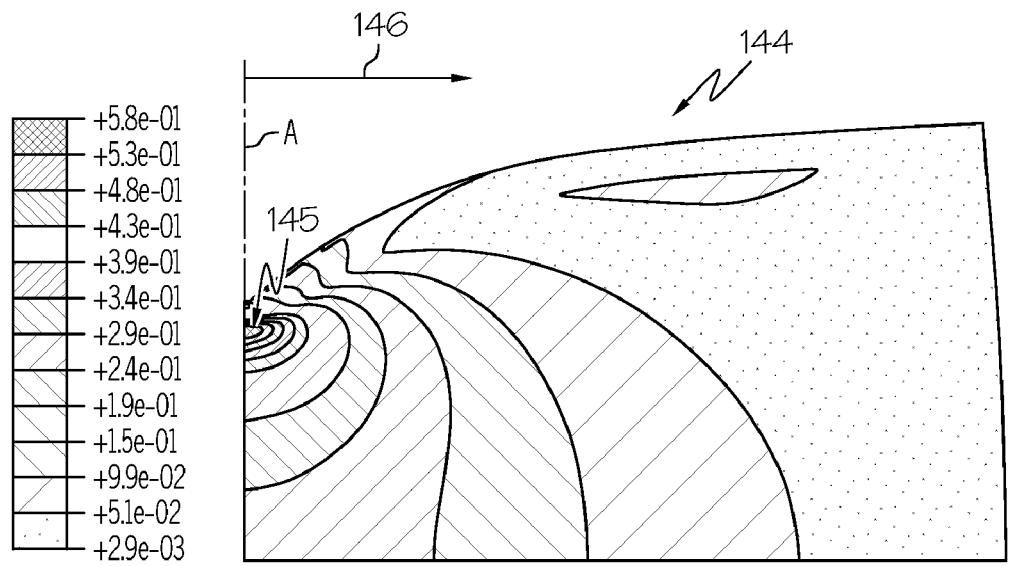
FIG. 7 shows a two-dimensional axi-symmetric finite element analysis stress contour plot produced in accordance with experimental data obtained from the probe indent test of FIGS. 3A-3B.

FIG. 7 shows a two-dimensional axi-symmetric FEA stress contour plot produced in accordance with experimental data obtained from the probe indent test of FIGS. 3A-3B. In various embodiments, the models may be discretized to benchmark various experimental tests. For example, models of the probe indent for the subcutaneous layers of the cheek and cheekbone, discretized as a two-dimensional (2D) axi-symmetric FEA stress contour plot of a probe indent simulation, may be generated using commercially generated FEA software. An example probe indent stress simulation plot 144 is illustrated in FIG. 7. As shown, the probe indent stress simulation plot 144 is symmetric about axis A. The point of highest stress 145 is where the probe contacts the skin as shown by the probe 50 in FIG. 3A in use in an actual probe indent test to obtain measurement data. The probe indent stress simulation plot 144 shows a decrease in stress along direction 146 away from the axis A of symmetry about the point of highest stress 145 where the probe (e.g., the probe 50) contacts the skin. It may be appreciated that models for other skin sites also may be generated.

Figure 8:
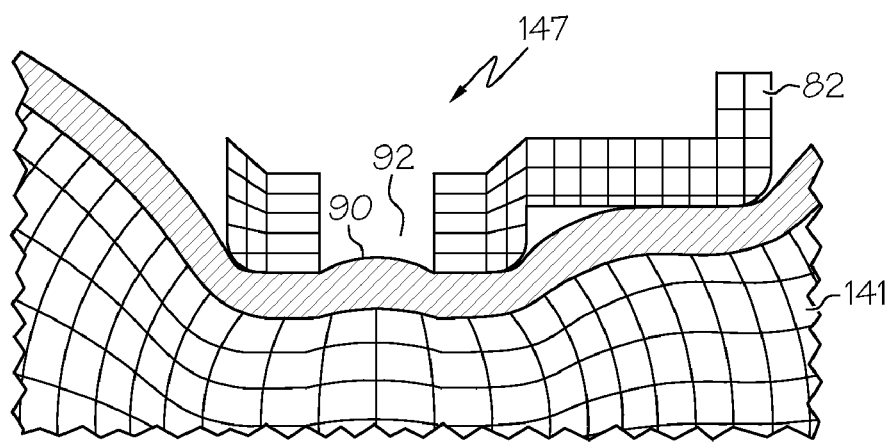
FIG. 8 shows a two-dimensional plane strain finite element analysis deformation of skin bulge produced in accordance with experimental data obtained from the skin bulge test of FIGS. 4A-4B.

FIG. 8 shows a two-dimensional plane strain FEA deformation of skin bulge produced in accordance with experimental data obtained from the skin bulge test of FIGS. 4A-4B. The bulge height in the skin bulge testing may be dominated by the properties of the dermis layer. As shown in FIG. 8, a model 147 of the skin bulge testing, discretized as a 2D plane strain, may be generated using commercially available FEA software. The model 147 may comprise a simulated skin 141, the die 82 with a slot 92, and a skin bulge 90. Models of both the cheek and the cheekbone containing each layer may be generated. It may be appreciated that models for other skin sites may also be generated, such as a leg site. Simulations of the skin bulge test and iterating the dermis material vales of the shear modulus, locking stretch, and global interaction parameter may be modified to give an acceptable agreement with the experimental bulge height curve.

Figure 9:
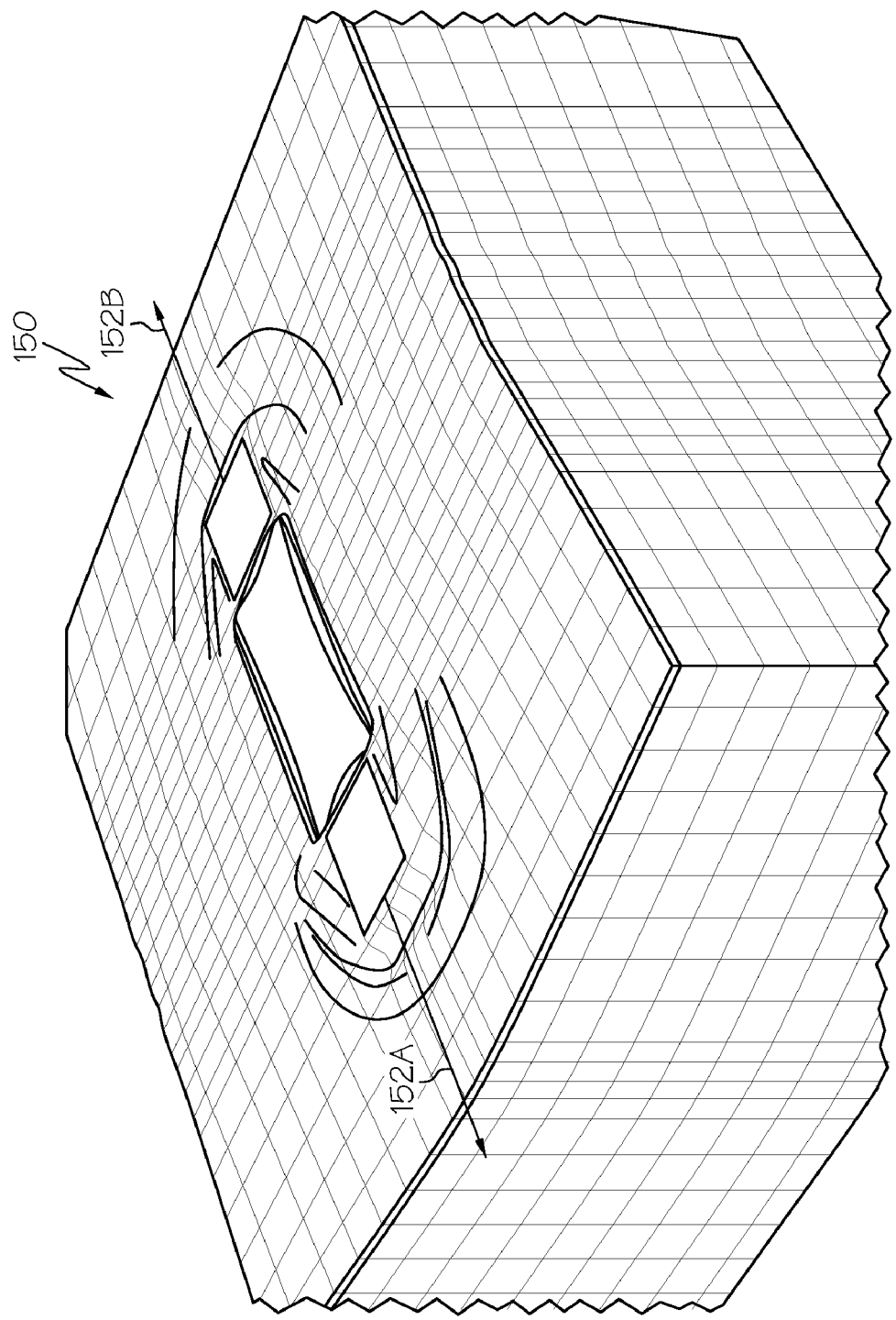
FIG. 9 shows a mirrored image of extensometry finite element analysis stress contour plot produced in accordance with experimental data obtained from the extensometry test of FIGS. 5A-5B.

FIG. 9 shows a mirrored image of extensometry FEA stress contour plot produced in accordance with experimental data obtained from the extensometry test of FIGS. 5A-5B. The force displacement response in the extensometry may be dominated by the properties of the epidermis layer. Accordingly, a model of the extensometry testing, discretized using three-dimensional (3D) volumetric elements having quarter symmetry, may be generated in using commercially available FEA software. FIG. 9 provides an example embodiment of a mirrored image of an extensometry FEA stress contour plot 150. Simulations of the skin stretching in directions 152A and 152B and iterating the epidermis material values of the shear modulus, locking stretch and global interaction parameters may be modified to give an acceptable agreement with the measured force displacement curve from skin stretching.

Figure 10:
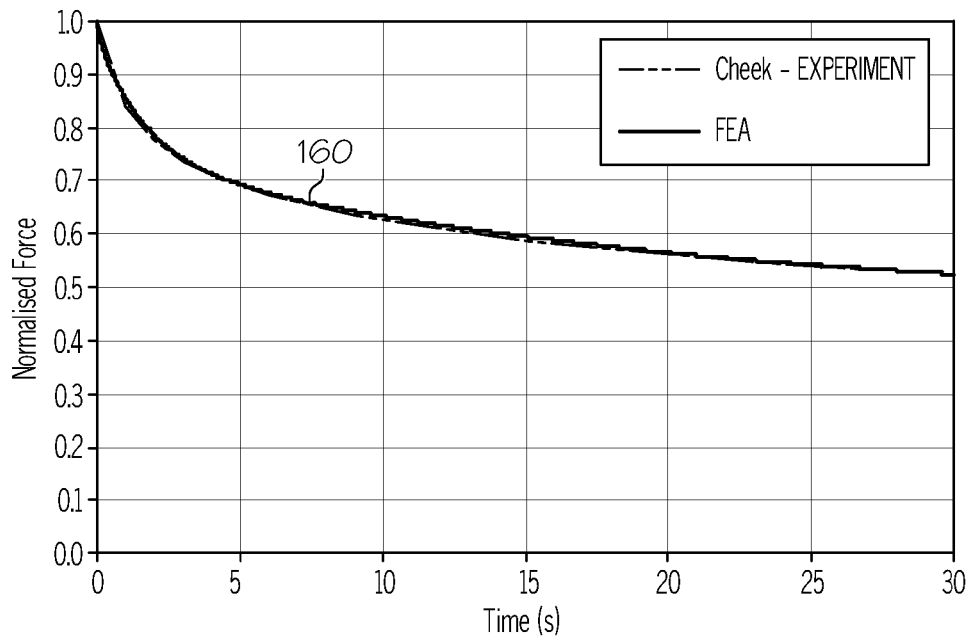
FIG. 10 shows a force relaxation graph produced with data obtained from the extensometry test of FIGS. 5A-5B.

FIG. 10 shows a force relaxation graph produced with data obtained from the extensometry test of FIGS. 5A-5B. In various embodiments, each skin layer is assigned the same viscoelastic formulation using the Prony time series expansion (3) formulation previously discussed. The extensometry tests, along with measuring the tensile response of the surface tissue, also may include a test to measure the force relaxation rate of skin under constant displacement. This measurement may be carried out by holding the first foot 100 and the second foot 102 (FIG. 5A) apart and recording the force reduction rate of the skin. The Prony time series expansion (3) formulation may be used to fit an average experimental curve 160 illustrated in FIG. 10.

Figure 11:
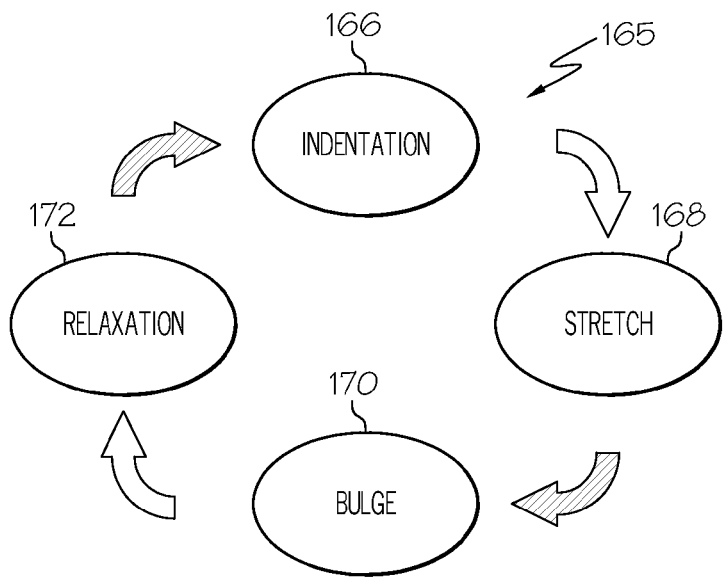
FIG. 11 shows one embodiment of an iterative process to obtain agreement with experimental results obtained from the probe indent test of FIGS. 3A-3B, the skin bulge test of FIGS. 4A-4B, the extensometry test of FIGS. 5A-5B, and the maneuverability test of FIG. 6A.

FIG. 11 shows one embodiment of an iterative process to obtain agreement with experimental results obtained from the probe indent test of FIGS. 3A-3B, the skin bulge test of FIGS. 4A-4B, the extensometry test of FIGS. 5A, 5B, and the maneuverability test of FIG. 6A. In one embodiment, after the models for each layer have an acceptable level of agreement with each experimental test, the procedure may be repeated because material changes in one layer of skin have an affect on its adjacent layer of skin, primarily due to the skin layers being fully bonded. As shown in FIG. 11, this iteration cycle 165 may be repeated until acceptable agreement is obtained in all benchmark tests. For example, the iteration may start with skin indentation 166 by obtaining agreement with experimental results obtained by the probe indent test of FIG. 3A and the FEA model. The iteration may proceed to skin stretch 168 by obtaining agreement with experimental results obtained by the extensometry test of FIG. 5A and the FEA model. Next, the iteration may proceed with skin bulge 170 by obtaining agreement with experimental results of the skin bulge test of FIG. 4A and the FEA model. The iteration may then proceed with skin relaxation 172 by obtaining agreement with experimental results of extensometry test of FIG. 5A and the FEA model. Upon completion of the process, a computer-based skin material model is completed. Further, it is appreciated that the skin material model may be developed for other skin locations sites of interest, such as the leg or axilla areas. Accordingly, the present disclosure is not limited to the facial region.

Figure 12:
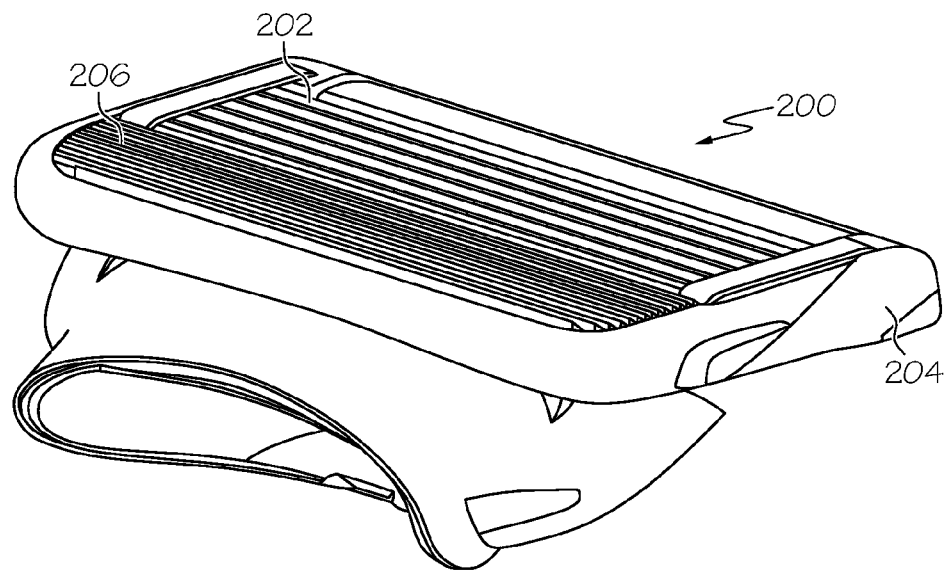
FIG. 12 shows one embodiment of a shaving device produced in accordance with the skin modeling technique.
Figure 13:
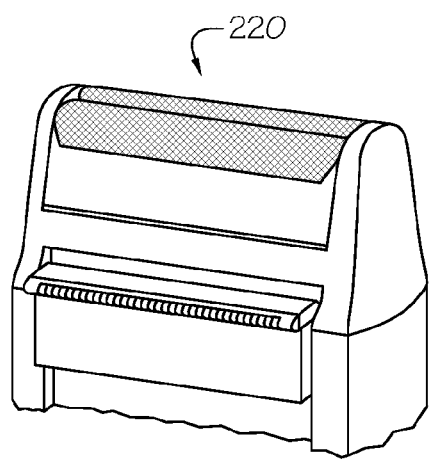
FIG. 13 shows one embodiment of a shaving device produced in accordance with the skin modeling technique.

FIG. 12 shows one embodiment of a shaving device 200 produced in accordance with the skin modeling technique. The skin material model may be utilized to model the reaction of the skin to various computer-based shaving device designs. As may be appreciated, any type of shaving device may be modeled, such as a razor cartridge, a foil shaver, or a rotary shaver, for example. An example razor cartridge type shaving device 200 is illustrated in FIG. 12. An example foil type shaving device 220 is illustrated in FIG. 13. As illustrated in FIG. 12, the shaving device 200 may comprise a plurality of blades 202, a housing 204, and other features, such as a contact strip 206. It is also appreciated that the housing 204 may be able to articulate with respect to a handle (not shown). Other shaving devices may include more or fewer features and/or more or less functionality. Using the skin material model and a computer-based version of the shaving device design, the interaction of simulated skin with the shaving load delivered by the "virtual" shaving device 200 may be modeled. Based on the behavior of the skin during a shaving stroke, the design of the shaving device 200 may be altered. For example, the angle of the blades 202 with respect to the housing may be altered, the number of blades 202 may be altered, the spacing of the blades 202 may be altered, the dimensions of the contract strip 206 may be altered, as well as numerous other design modifications. It is appreciated that a variety of iterations for various parameters may each be tested using the skin material model. The results of the interaction of the shaving device 200 with the skin material model, such as the predicted skin interaction, may be stored in a computer-readable medium. As may be appreciated, data analysis may be performed on the various results stored in the computer-readable medium.

As may be appreciated, an absorbent article may also be produced in accordance with the skin modeling technique. For example, the load delivered to the skin by an absorbent article may be modeled or tested with the skin material model. Based on data retrieved from the skin material model, the design of the absorbent article altered. Example absorbent articles may include products and/or materials for sanitary protection, hygienic use, and/or wound care. Furthermore, diapers, incontinence briefs, feminine pads, feminine liners, bandages, dressings, and other forms and types of absorbent articles may be modeled and tested with the skin material model.

FIG. 13 shows an example computer apparatus 300 for developing the skin material model. The computer apparatus 300, or a separate computing system, may be used to test the performance of the device design using the skin model. For example, the computer apparatus may test the performance of a shaving device or an absorbent article device. The computer apparatus 300 includes a main unit 302, a keyboard 304, and a mouse (not shown) serving as input means, and a display 306 serving as output means. The computer apparatus 300 also may include inputs from various measurement and data input devices used during the tests described above (e.g., indentation 166, stretch 168, bulge 170, relaxation 172). Although not shown, the main unit 302 is provided with a central processing unit (abbreviated as "a CPU"), a ROM, a working memory, a large-capacity storage device such as a magnetic disk, and CD-ROM or a flexible disk drive 308, for example. The large-capacity storage device stores therein processing procedures (i.e., programs) for executing the method. The computer apparatus 300 may execute FEA software.

Figure 14:
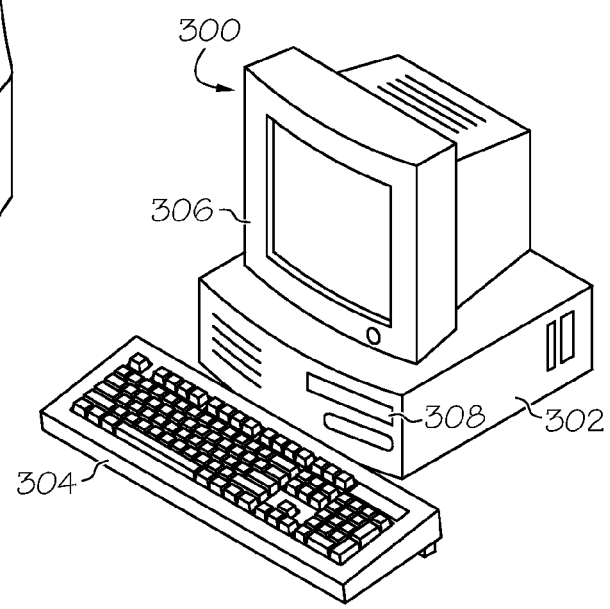
FIG. 14 shows a computer apparatus for implementing one embodiment of the skin modeling techniques.
Figure 15:
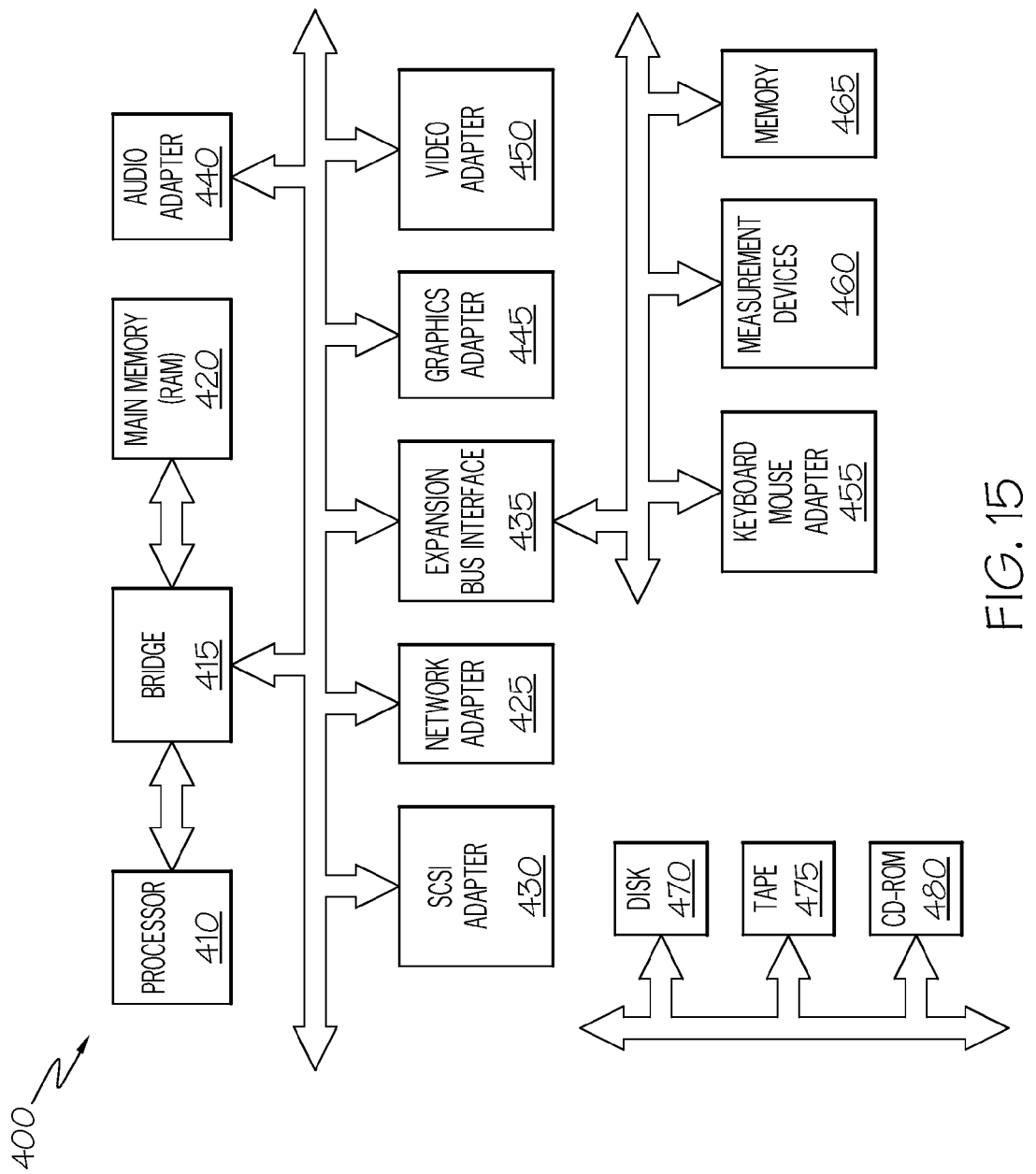
FIG. 15 shows a computing system for implementing one embodiment of the skin modeling technique.

FIG. 15 shows a computing system for implementing one embodiment of the skin modeling technique. A block diagram illustrates a computing system 400 in which the present embodiments may be implemented, and in which code or instructions implementing the processes of various embodiments may be located. The example computer system in FIG. 14 is discussed only for descriptive purposes. Although the following descriptions relate to a particular computer system, the concepts apply equally to other computer systems that are dissimilar to that shown in FIG. 15.

Computing system 400 includes a processor 410 and main random access memory (RAM) 420 connecting to a local bus 405 through a bridge 415. Additional connections to local bus 405 may be made through direct component interconnection or through add-in boards. In the depicted example, network adapter 425, small computer system interface ("SCSI") adapter 430, and expansion bus interface 435 are directly connected to local bus 405. In contrast, audio adapter 440, graphics adapter 445, and video adapter 450 are connected to local bus 405 by add-in boards inserted into expansion slots. Expansion bus interface 435 provides a connection for a keyboard and mouse adapter 455, measurement devices 460, and additional memory 465. SCSI adapter 430 provides a connection for a hard disk drive 470, tape drive 475, and CD-ROM drive 480.

In order to communicate with other computer systems via a network, the computer system 400 may connect to the network via network adapter 425. The network, Internet or intranet, for example, connects multiple network devices utilizing general purpose communication lines. It is also appreciated that the measurement devices 460 may communicate with various components of the computer system via a network.

It may be appreciated that the hardware shown in FIG. 15 may vary depending on the implementation. Other internal hardware or peripheral devices, such as flash ROM (or equivalent nonvolatile memory) or optical disk drives and the like, may be used in addition to or in lieu of the hardware depicted in FIG. 15. Also, the various processes discussed herein may be applied to a multiprocessor computer system. In general, computer system 400 is controlled and coordinated by operating system (OS) software, which performs tasks such as process scheduling, memory management, networking and I/O services.

Figure 16:
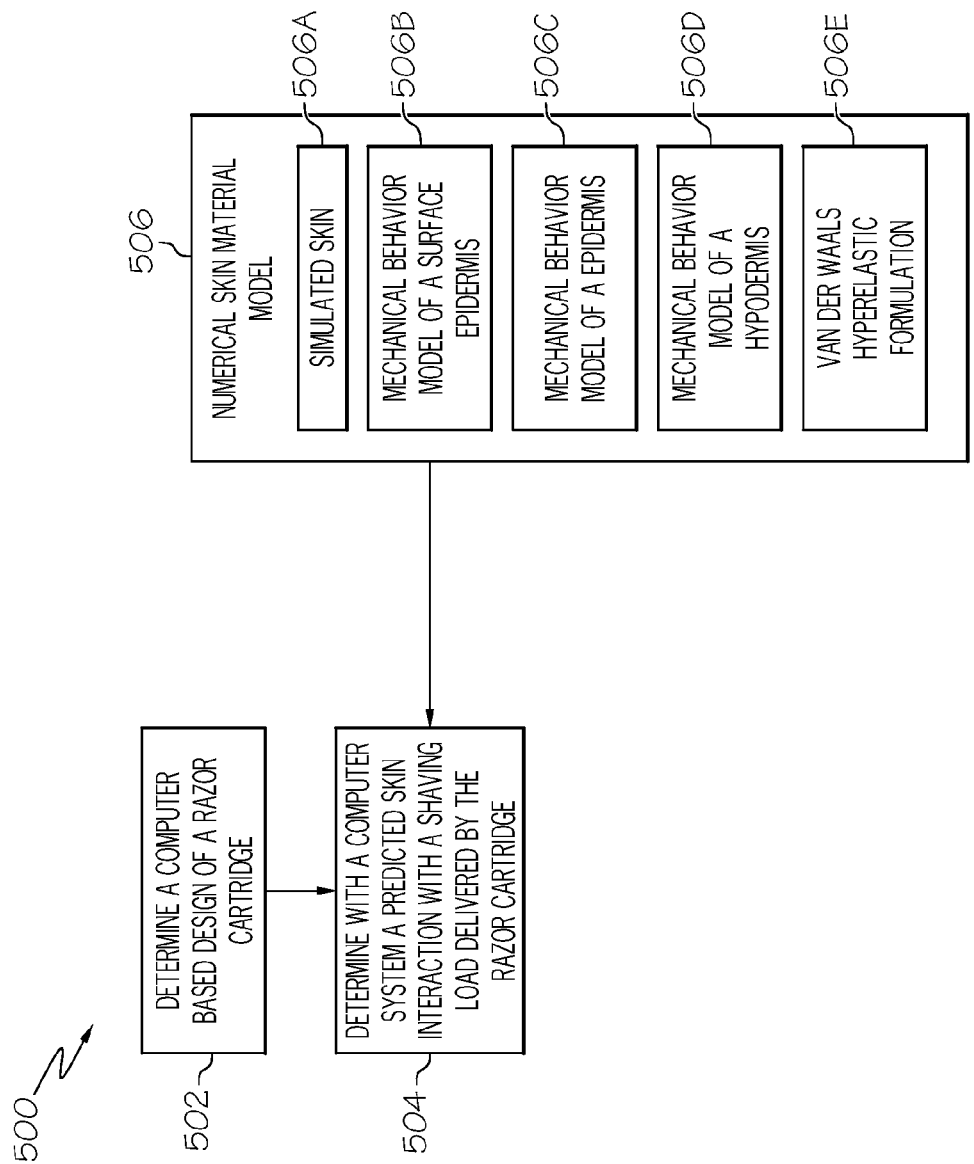
FIG. 16 shows a diagram of an example process for modeling the response of skin to a shaving device design.

FIG. 16 is a diagram of an example process 500 for modeling the response of skin to a shaving device design. In one embodiment, a computer-based design of a shaving device is determined 502. Next, a predicted skin interaction with a shaving load delivered by the shaving device using a computer generated numerical skin material model 506 may be determined 504. The numerical skin material model 506 may comprise a simulated skin 506A, a mechanical behavior model of a surface epidermis, 506B, a mechanical behavior model of a dermis 506C, a mechanical behavior model of a hypodermis 506D, and a van der Waals hyperelastic formulation 506E to represent the behavior of the simulated skin. In various embodiments, the van der Waals hyperelastic formulation 506E represents the non-linear behavior of the simulated skin. In various embodiments, the van der Waals hyperelastic formulation 506E may be defined in terms of its strain potential as shown in formula (1).

The numerical skin material model 506 may further comprises a Prony time series expansion to represent non-linear viscoelastic strain stiffening, as shown in Prony time series expansion (3). In various embodiments, the numerical skin material model 506 may be numerically characterized using a first site and a second site, such as a cheek site and a cheekbone site, for example. The surface epidermis may be mechanically characterized and a constitutive material model formulation may be used to numerically represent the mechanical characterization of the surface epidermis. The dermis may be mechanically characterized and a constitutive material model formulation may be used to numerically represent the mechanical characterization of the dermis. The hypodermis is mechanical may be characterized and a constitutive material model formulation may be used to numerically represent the mechanical characterization of the hypodermis.

Figure 17:
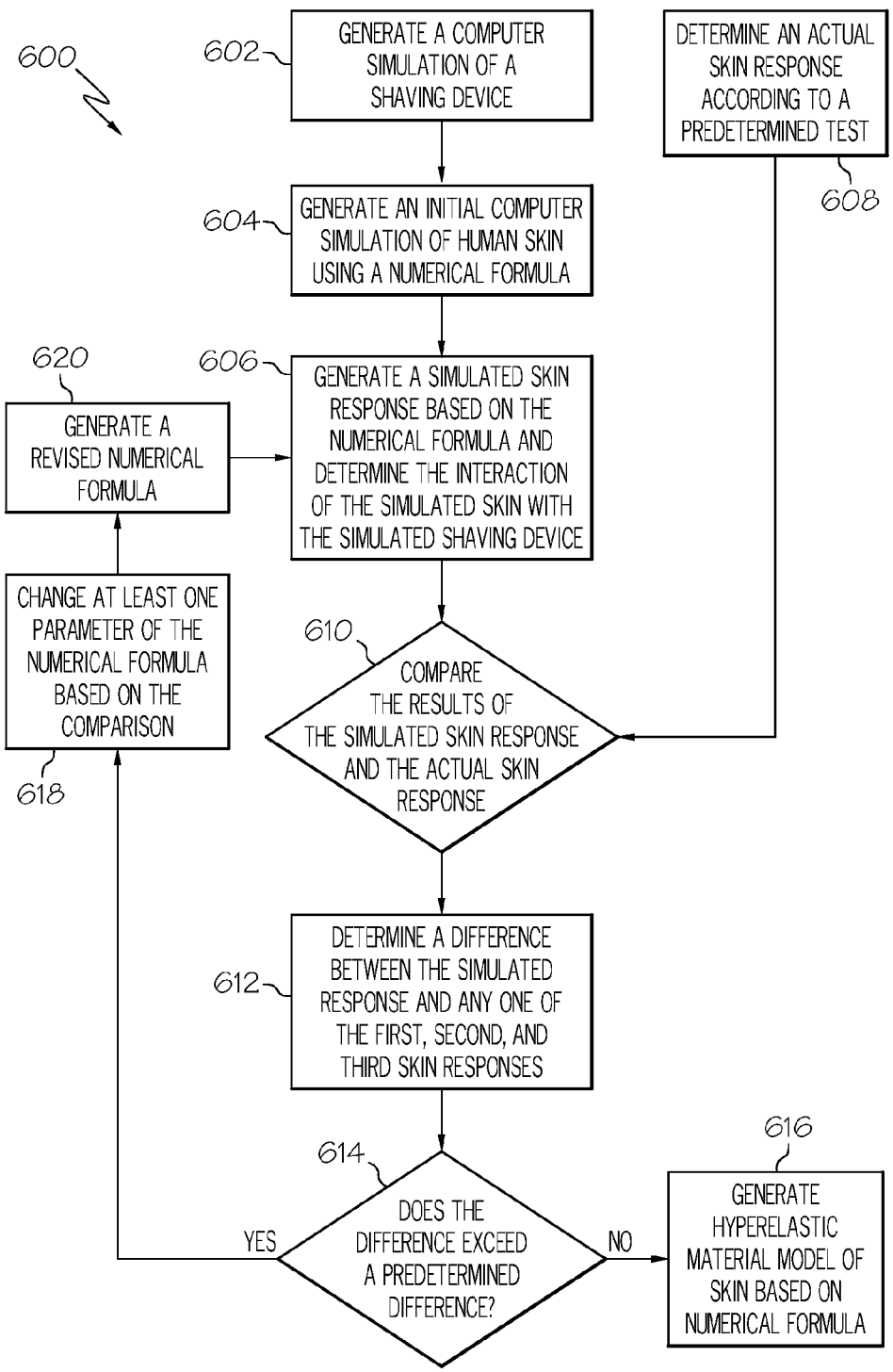
FIG. 17 shows a diagram of an example process for formulating a hyperelastic material model of a skin based on a numerical formula.

FIG. 17 shows a diagram of an example process 600 for formulating a hyperelastic material model of a skin based on a numerical formula. As may be appreciated, a computer system with a processor may be used to perform the process 600. In one embodiment, a computer simulation of a shaving device is generated 602. Next, an initial computer simulation of human skin using a numerical formula is generated. Next, a simulated skin response based on the numerical formula is determined and the interaction of the simulated skin with the simulated shaving device is determined 606. The actual skin response may be generated according to a predetermined test 608. In one embodiment, a probe indent test, a skin bulge test, and an extensometry test are utilized. As shown in the illustrated embodiment, the results of the simulated skin response may be compared to an actual skin response 610. A difference between the simulated response and any one of the first, second, and third skin responses may be determined 612. Next, it may be determined if the difference exceeds a predetermined difference 614. If the difference does not exceed the predetermined difference, the hyperelastic material model of skin may be formulated 616. The hyperelastic material model may be based on a van der Waals hyperelastic formulation defined in terms of its strain potential, as shown in formula (1). If, however, the difference does exceed the predetermined difference, at least one parameter of the numerical formula may be changed based on the comparison 618. After changing at least one parameter, a revised numerical formula may be generated 620.

As used herein, a "computer" or "computer system" may be, for example and without limitation, either alone or in combination, a personal computer ("PC"), server-based computer, main frame, server, grid computer, microcomputer, minicomputer, laptop, personal data assistant ("PDA"), cellular phone, processor, including wireless and/or wireless varieties thereof, and/or any other computerized device capable of configuration for receiving, storing, and/or processing data for standalone applications and/or over the networked medium or media.

In general, computer-readable memory media described herein may include any memory medium capable of storing instructions for execution by or to be executed by a programmable apparatus. Where applicable, any process steps described herein may be embodied or executed as instructions stored on a computer-readable memory medium or memory media. These instructions may be software embodied in various programming languages such as C++, C, Java, and/or a variety of other kinds of computer programming languages that may be applied to create instructions in accordance with various embodiments. As used herein, the terms "module" and "engine" represent software to be executed by a processor of the computer system. The software may be stored in a memory medium.

The skin material model, or any of its associated components or modules, may include operatively associated computer-readable media such as memory for storing software applications used in obtaining, processing, storing, and/or communicating data. It can be appreciated that such memory can be internal, external, remote, or local with respect to its operatively associated computer or computer system. Memory may also include any means for storing software or other instructions including, for example and without limitation, a hard disk, solid state disk, optical disk, floppy disk, DVD, compact disc, memory stick, ROM (read-only memory), RAM (random access memory), PROM (programmable ROM), EEPROM (electrically erasable PROM), and/ or other like computer-readable media.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments.

The processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, magnetic disk, or solid state disk. Furthermore, at least some of the processes may be programmed when the computer system is manufactured or stored on various types of computer-readable media.

The dimensions and values disclosed herein are not to be understood as being strictly understood to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method comprising:
    determining the interaction of a simulated human skin with a simulated load delivered by a simulated device to the simulated human skin, wherein a behavior of the simulated human skin is represented by a van der Waals hyperelastic formula implemented by a computer system.

2. The method of claim 1, wherein the simulated device is a shaving device.

3. The method of claim 2, comprising generating a computer simulation of the shaving device.

4. The method of claim 2, wherein the shaving device is selected from the group consisting of a razor cartridge, a foil shaver, and a rotary shaver.

5. The method of claim 3, comprising generating a computer simulation of human skin.

6. The method of claim 1, wherein the simulated device is an absorbent article.

7. The method of claim 6, comprising generating a computer simulation of the absorbent article.

8. The method of claim 1, wherein the van der Waals hyperelastic formula represents the behavior of the simulated skin in accordance with any of an epidermis, a dermis, and a hypodermis layer of skin.

9. The method of claim 8, comprising determining a first response of at least the hypodermis layer of skin using a probe indent test.

10. The method of claim 9, comprising determining a second response of at least the dermis layer of skin using a skin bulge test.

11. The method of claim 10, comprising determining a third response of at least the epidermis layer of skin using an extensometry test.

12. The method of claim 11, comprising comparing with a computer system a simulated skin response generated by the van der Waals hyperelastic formula to any of the first response, the second response, and the third response.

13. The method of claim 12, comprising determining a difference between the simulated skin response and any one of the first, second, and third skin responses, and changing at least one parameter of the van der Waals hyperelastic formula based on the comparison when there is a predetermined difference between the simulated response and any one of the first, second, and third skin layer responses.

14. The method of claim 1, comprising determining a strain stiffening viscoelasticity of the simulated human skin by a Prony time series expansion.

15. The method of claim 14, wherein the Prony time series expansion is expressed as:

$$\mu^R(t) = \mu^0\left(1 - \sum_{k=1}^{N} \bar{g}_k^P(1 - e^{-t/\tau_k})\right)$$

wherein:
    $\mu^R(t)$ is the relaxation coefficient at time (t);
    $\mu^0$ is the initial value of the Prony time series expansion at the beginning of the relaxation time;
    $\bar{g}_i^P$ is the moduli ratio of the shear modulus; and
    $\tau_i$ is the relaxation time for the first term in the Prony time series expansion.

16. The method of claim 1, comprising characterizing the simulated human skin using a first site and a second site.

17. The method of claim 16, wherein the first site is a cheek site and the second site is a cheekbone site.

18. The method of claim 1, comprising characterizing the simulated human skin using at least one site selected from the group consisting of face, neck, legs, groin, and axilla.

19. The method of claim 1, wherein the van der Waals formulation is defined in terms of its strain potential as:

$$U = \mu\left\{-(\lambda_m^2 - 3)[\ln(1-\eta) + \eta] - \frac{2}{3}\alpha\left(\frac{\tilde{I}-3}{2}\right)^{\frac{3}{2}}\right\} + \frac{1}{D}\left(\frac{J_{el}^2-1}{2} - \ln J_{el}\right)$$

wherein:
  $\mu$ is the shear modulus;
  $\lambda_m$ is the locking stretch;
  $\alpha$ is the global interaction parameter;
  D is the compressibility;
  $\beta$ is a linear mixture parameter, (0.0<$\beta$<1.0);
  $J_{el}$ is the elastic volume strain;
  $\tilde{I}$ is a strain invariant; and $$\eta = \sqrt{\frac{\tilde{I}-3}{\lambda_m^2 - 3}}.$$

20. A system for modeling the response of human skin to a shaving device, the system comprising:
  a processor to determine the interaction of a simulated human skin with a simulated shaving load delivered by a simulated shaving device to the simulated human skin, wherein a behavior of the simulated human skin is represented by a van der Waals hyperelastic formula.

21. The system of claim 20, wherein the processor is to generate a computer simulation of a shaving device.

22. The system of claim 21, wherein the processor is to generate a computer simulation of a human skin.

23. The system of claim 22, wherein a first response of at least the hypodermis layer of skin is determined using a probe indent test.

24. The method of claim 23, wherein a second response of at least the dermis layer of skin is determined using a skin bulge test.

25. The method of claim 24, wherein a third response of at least the epidermis layer of skin is determined using an extensometry test.

26. The method of claim 25, wherein the processor is to compare the simulated skin response generated by the van der Waals hyperelastic formula to any of the first response, the second response, and the third response.

27. The method of claim 26, wherein the processor is to determine a difference between the simulated skin response and any one of the first, second, and third skin responses, and change at least one parameter of the van der Waals hyperelastic formula based on the comparison when there is a predetermined difference between the simulated response and any one of the first, second, and third responses.

28. The system of claim 20, wherein the van der Waals hyperelastic formula represents the behavior of the simulated skin in accordance with any of a surface epidermis, a dermis, and a hypodermis.

29. The system of claim 20, wherein the processor is to determine a strain stiffening viscoelasticty of the simulated human skin by a Prony time series.

30. The system of claim 29, wherein the Prony time series expansion $\mu^R(t)$ is expressed as:

$$\mu^R(t) = \mu^0\left(1 - \sum_{k=1}^{N} \bar{g}_k^P(1 - e^{-t/\tau_k})\right)$$

wherein:
  $\mu^R(t)$ is the relaxation coefficient at time (t);
  $\mu^0$ is the initial value of the Prony time series expansion at the beginning of the relaxation time;
  $\bar{g}_i^P$ is the moduli ratio of the shear modulus; and
  $\tau_i$ is the relaxation time for the first term in the Prony time series expansion.

31. The system of claim 20, wherein the human skin is characterized using a first site and a second site.

32. The system of claim 31, wherein the first site is a cheek site and the second site is a cheekbone site.

33. The method of claim 20, comprising characterizing the simulated human skin using at least one site selected from the group consisting of face, neck, legs, groin, and axilla.

34. The system of claim 20, wherein the van der Waals formulation is defined in terms of its strain potential as:

$$U = \mu\left\{-(\lambda_m^2 - 3)[\ln(1-\eta) + \eta] - \frac{2}{3}\alpha\left(\frac{\tilde{I}-3}{2}\right)^{\frac{3}{2}}\right\} + \frac{1}{D}\left(\frac{J_{el}^2-1}{2} - \ln J_{el}\right)$$

wherein:
  $\mu$ is the shear modulus;
  $\lambda_m$ is the locking stretch;
  $\alpha$ is the global interaction parameter;
  D is the compressibility;
  $\beta$ is a linear mixture parameter, (0.0<$\beta$<1.0);
  $J_{el}$ is the elastic volume strain;
  $\tilde{I}$ is a strain invariant; and $$\eta = \sqrt{\frac{\tilde{I}-3}{\lambda_m^2 - 3}}.$$

* * * * *